Patented Feb. 18, 1936

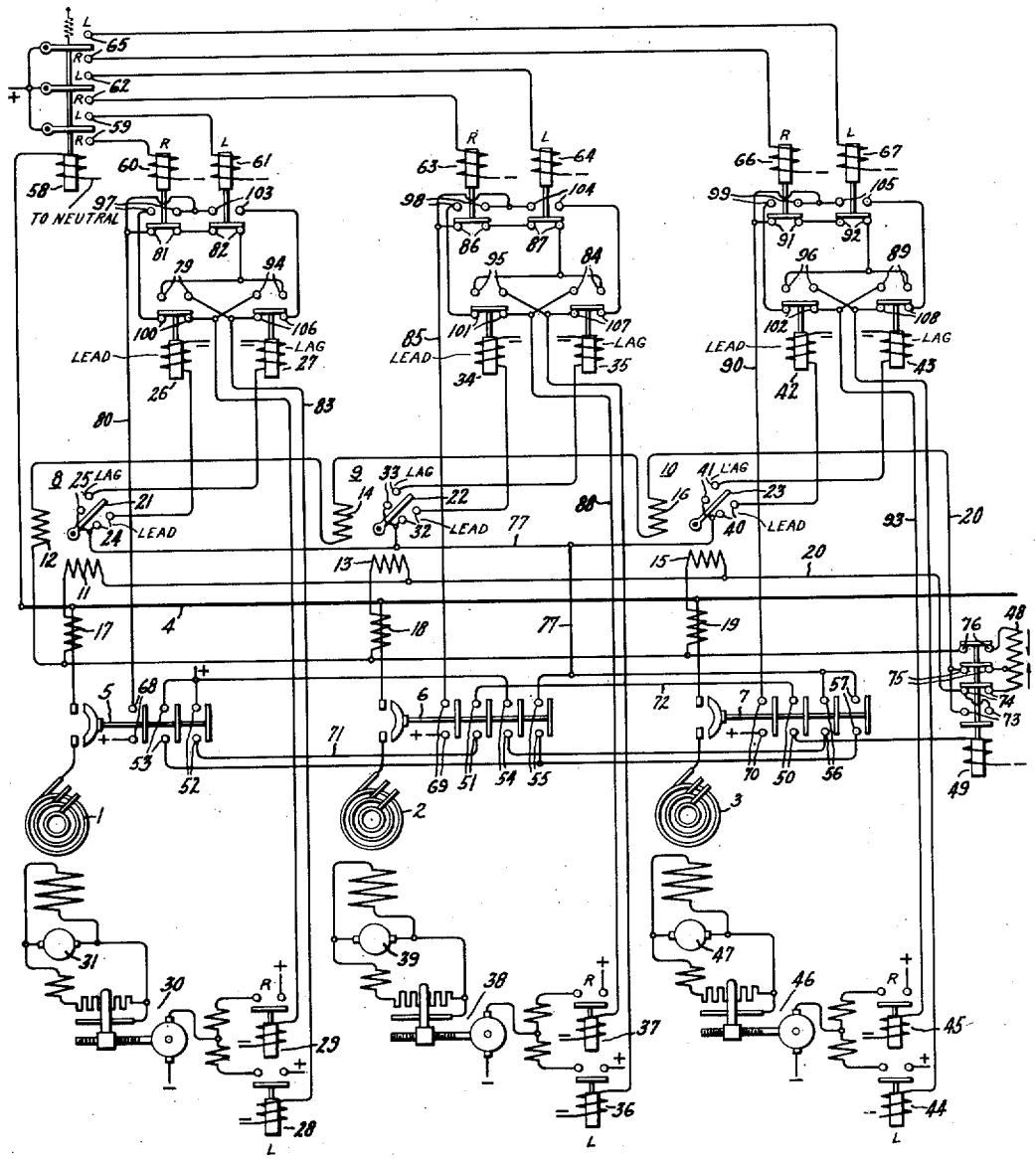

2,031,452

UNITED STATES PATENT OFFICE 2,031,452

ELECTRICAL REGULATING SYSTEM

Herman Bany, Lansdowne, Pa., assignor to General Electric Company, a corporation of New York Application March 2, 1935, Serial No. 9,060

9 Claims. (Cl. 171—119)

My invention relates to automatic electrical regulating systems and more particularly to a system for controlling the wattless current interchange between, and the voltage of, a plurality of parallel connected alternating current dynamo-electric machines, such as synchronous generators for example.

When a plurality of synchronous generators are connected in parallel, usually to a common bus, in a power station or automatic substation, it is important to maintain the voltage of the bus substantially constant and also to maintain the voltages of the individual machines substantially the same. If the bus voltage is allowed to vary it adversely affects the operation of load devices which may be connected thereto and it is also likely to cause a relatively high wattless current interchange between the machines connected to the bus, on the one hand, and other similar machines in other stations which are connected in the same system, on the other hand. These wattless currents, either leading or lagging, while doing no useful work do tend to overload the conductors and to produce objectionable losses. If the individual machine voltages are not maintained the same there is a wattless current interchange between these machines and this wattless circulating current tends unduly to overheat the generators and lower their efficiency.

In accordance with an important feature of my invention, I provide each of a plurality of parallel machines with individual relays each having two windings one of which is connected to be responsive to the current of its associated machine and the other of which is responsive to a current which is proportional to the total current of all the machines. By properly proportioning the windings, or by other equivalent means, these relays may be made to balance, or assume a neutral position, whenever the current in its associated machine is equal to the average current in all of the machines. With such a relation of individual machine currents to the total current of all of the machines there will be no circulating wattless current and the power factor of each machine will be the same. If then the voltage of one machine varies so as to cause a circulating current the relay's balances will be disturbed and the relays may be arranged to respond in such a way as to cause voltage correction in the direction to reduce or eliminate the circulating current. However, this feature of my invention is not necessarily limited to circulating current response and for controlling any other suitable quantities of parallel circuits the two coils of the relays may be connected to respond respectively to the individual and total values of such quantities.

An object of my invention is to provide a new and improved electrical regulator.

Another object of my invention is to provide a new and improved arrangement for controlling circulating currents between parallel alternating current dynamo-electric machines.

A further object of my invention is to provide a new and improved automatic system for regulating the voltage and wattless current interchange between parallel connected synchronous generators.

My invention will be better understood from the following description taken in connection with the accompanying drawing and its scope will be pointed out in the appended claims.

Referring now to the single figure of the accompanying drawing, which is a simplified diagrammatic showing of one embodiment of my invention, there is shown therein three synchronous generators 1, 2 and 3 connected in parallel to a common bus or circuit 4. The machine will ordinarily be three phase, as shown, but for the sake of simplicity the detail connections of only one phase are shown, it being understood that the connections for the other phases are similar. The connections between the generators 1, 2 and 3 and the bus 4 are controlled respectively by individual switches or circuit breakers 5, 6 and 7. The generators 1, 2 and 3 are provided respectively with individual circulating current responsive relays 8, 9 and 10. These relays need not be of any particular type, but the type which I at present contemplate using is an induction disc type relay whose electromagnetic structure is similar to that of an alternating current watt-hour meter except that the usual potential coil of the watt-hour meter is replaced by a current coil so that the relay has two current coils instead of a potential coil and a current coil as in a watt-hour meter. With such a relay, when the currents in the two inductively related current coils are in phase no torque is produced, but if the currents are out of phase the torque increases as the phase angle increases, up to 90 degrees, and the torque will also be proportional to the values of the currents in the coils. The torque will also reverse depending upon whether the current in one coil leads or lags the current in the other coil. It will thus be seen that such relays are responsive to both the magnitude of the currents in the current coils and also to the relative phase of the currents in these coils. As the circulating current in a synchronous generator is superimposed on the load current carried by the generator, circulating current produces changes in both magnitude and phase of the total generator current and consequently an induction disc relay of the above described type has the advantage that it responds to both the effects produced by circulating currents.

The above described action of the relays 8, 9 and 10, with respect to the currents in their two windings, is exactly the same as the action of a conventional induction disc alternating current watt-hour meter with respect to the currents in its two windings. However, in such a meter the potential winding is relatively highly inductive and the current in it is substantially 90 degrees out of phase with the voltage producing it. Consequently, in the watt-hour meter when the voltage and current of the voltage and current windings are in phase the currents in these windings are 90 degrees out of phase, which is the condition for maximum torque, and when the current and voltage of the current and voltage windings are 90 degrees out of phase the currents in these windings are in phase, which is the condition of zero torque.

The two windings of relay 8 are designated by the reference characters 11 and 12, the corresponding windings of relay 9 by the reference characters 13 and 14, and the corresponding windings of the relay 10 are designated by the characters 15 and 16. The windings 11, 13 and 15 are connected, respectively, to carry currents proportional to the currents of their associated machines 1, 2 and 3, respectively, by means of current transformers 17, 18 and 19 and the return circuit for these three currents is passed through a conductor 20 in which are connected the other windings 12, 14 and 16 in series. Thus, windings 11, 13 and 15 carry currents proportional to the currents in their associated machines, while windings 12, 14 and 16 carry currents proportional to the total current of all of the machines.

Relays 8, 9 and 10 are each provided with movable contacts 21, 22 and 23, respectively. Contact 21 is arranged selectively to complete a circuit through sets of contacts 24 and 25 and these circuits control respectively, relays 26 and 27, which relays in turn control, respectively, relays 28 and 29. Relays 28 and 29 control the direction of operation of a conventional reversible pilot motor operated field rheostat 30 for controlling an exciter 31 for generator 1. Similarly, contact 22 of relay 9 selectively controls circuits through sets of contacts 32 and 33 which circuits control, respectively, relays 34 and 35 and these relays in turn control relays 36 and 37. The latter relays control a reversible pilot motor operated field rheostat 38 for an exciter 39 for machine 2. Likewise contact 23 of relay 10 controls selectively the completion of circuits through sets of contacts 40 and 41 which circuits control, respectively, relays 42 and 43. Relays 42 and 43 control, respectively, relays 44 and 45 for determining the direction of operation of a reversible pilot motor operated field rheostat 46 for an exciter 47 for machine 3.

If the number of power machines is reduced, that is to say, if, for example, one of the three machines is disconnected from the others, the normal range of individual machine currents will not vary, but the range of total current will normally be less by approximately one third. In order to maintain the sensitivity of the relays 8, 9 and 10 unimpaired when this happens there is provided an autotransformer 48 for automatically making up the current deficiency in the relay windings carrying current proportional to the total current of the machines. This autotransformer is controlled by a relay 49 whose energization is controlled by series interlocks, or back contacts, 50, 51 and 52 controlled by circuit breakers 7, 6 and 5, respectively.

If only one of the three generators is in operation there is of course no parallel operation so there cannot be any problem of circulating current. Consequently the circulating current responsive relay of the single machine which is in operation will not respond, ordinarily, as the current in its two current coils must of course be in phase. However, in order to prevent accidental operation in case the relay should happen to be moved to one of its contact making positions, there are provided interlocks, or back contacts, 53, 54 and 55, and 56 and 57 on the circuit breakers 5, 6 and 7 for preventing the circulating current responsive relays 8, 9 and 10 from controlling their associated relays unless at least any two of the three generators are connected in parallel.

For controlling the voltage of bus 4 there is provided a voltage responsive device of any suitable type, illustrated by way of example as a contact making voltmeter 58. This meter has a set of raise and lower contacts 59 for controlling, respectively, a pair of raise and lower relays 60 and 61 whose contacts are electrically interlocked through the contacts of relays 26 and 27 for controlling the motor operated rheostat 30 for raising and lowering the voltage of generator 1. Contact making voltmeter 58 also has a set of raise and lower contacts 62 for controlling, respectively, raise and lower relays or contactors 63 and 64 which are similarly interlocked through relays 34 and 35 for controlling motor operated rheostat 38. There is also a third set of raise and lower contacts 65 on the contact making voltmeter for controlling, respectively, raise and lower relays 66 and 67 which are interlocked with the contacts of relays 42 and 43 for controlling the operation of the motor operated rheostat 46 for raising and lowering the voltage of generator 3.

In order to render the respective voltage controlling means for each of the generators inoperative when the generator is disconnected from the others there are provided back contacts 68, 69 and 70 on circuit breakers 5, 6 and 7, respectively, which back contacts open when the circuit breakers open and thereby render inoperative the voltage controlling relays for their associated machines.

The operation of the illustrated embodiment of my invention is as follows: Assume that generators 1, 2 and 3 have been synchronized with each other by any suitable well known means and that circuit breakers 5, 6 and 7 have been closed, either manually or by suitable well known automatic means. Assume further that the voltage of bus 4 is normal so that the contact making voltmeter 58 will assume its balanced midposition as illustrated. As soon as all three circuit breakers 5, 6 and 7 close, a circuit is completed from the positive side (shown above circuit breaker 5) of a suitable source of control current (not shown) through contacts 52 on circuit breaker 5, a conductor 71, contacts 51 on circuit breaker 6, a conductor 72, contacts 50 on circuit breaker 7 and through the operating winding of relay 49 to the negative side of the supply source. The energization of relay 49 causes it to close a set of contacts 73, and to open three sets of contacts 74, 75 and 76. The closure of contacts 73 completes the connection through the conductor 20 for energizing the total current carrying windings 12, 14 and 16 of the relays 8, 9 and 10. The opening of the contacts 74, 75 and 76 disconnects the auto-transformer 48, the detailed operation of which will be described later.

If now the individual generated voltages of all three machines are equal the power factors of each of the machines will also be equal, which means that the individual currents carried by the machines are in phase with the total current produced by all of the machines so that the currents in the two windings of each of the relays 8, 9 and 10 will be in phase with each other. Consequently these relays will all be in their neutral midpositions and nothing will happen.

Assume now that the generated voltages are not equal and that, for example, the voltage of generator 1 is higher than the voltages of the other two machines. Under these circumstances lagging wattless current will flow in machine 1 and this current will circulate as leading current in machines 2 and 3. Consequently, although the total current (vectorially) in all three machines does not change the current in machine 1 has added thereto a lagging wattless component and the currents in machines 2 and 3 have had added thereto leading wattless components so that the currents in the windings of the relays 8, 9 and 10 will now be out of phase with each other and this phase relation will be opposite in relay 8 from what it will be in relays 9 and 10. Assume that the wattless lagging current in machine 1 produces a clockwise torque in the relay 8, so that contact 21 bridges contact 24. Conversely, the leading wattless component in the machines 2 and 3 will cause the relays 9 and 10 to have produced therein counterclockwise torques which will cause their respective movable contact members 22 and 23 to bridge their contacts 33 and 41. Circuits are then completed, which have already been started from the positive side of the control source through contacts 53 and 55 in series to a conductor 77. It should also be observed that conductor 77 is connected to the positive side of the control source through two other parallel paths containing, respectively, contacts 54 and 56 in series and contacts 53 and 57 in series. Each of these parallel paths contain in series two sets of contacts each controlled by a different one of the circuit breakers so that, in effect, whenever any two circuit breakers are closed a current path is completed from the positive side of the control source to conductor 77 and only when all three of the circuit breakers are open are all three parallel connected paths broken. One circuit then continues from conductor 77 through contacts 21 and 24 on relay 8 to relay 26. The energization of relay 26 causes it to close a set of contacts 79. This then completes a circuit from the positive side of a control source (shown below circuit breaker 5) through contacts 68, a conductor 80, contacts 81 and 82 on relays 60 and 61, respectively, through contacts 79, a conductor 83 and to the negative side of the supply source through the relay 28. Energization of the relay 28 completes an energizing circuit for the motor operated rheostat causing it to operate in such direction as to lower the excitation and voltage of generator 1. As it was assumed that the voltage of generator 1 was too high, this lowering action is the correct one and tends to reduce the circulating current. At the same time, a circuit is completed from conductor 77 through the contacts 33 of relay 9 and thence to the other side of the control source through the relay 35. Energization of relay 35 closes contacts 84. The closing of the contacts 84 completes a circuit from the positive side of a control source through the contacts 69 of circuit breaker 6, thence through a conductor 85 to contacts 86 and 87 in series, on relays 63 and 64, respectively, thence through contacts 84 to conductor 88 and to the other side of the control source through raising contactor 37. This causes motor operated rheostat 38 to operate in a direction to raise the voltage and excitation of generator 2. At the same time, a third and similar circuit is completed from conductor 77, through the contacts 41 of relay 10 for energizing the relay 43. This causes relay 43 to close a set of contacts 89 whereby a circuit is completed from the positive side of a control source through contacts 70, conductor 90, contacts 91 and 92 on relays 66 and 67, respectively, thence through contacts 89 and through a conductor 93 to raise contactor 45 for motor operated rheostat 46. Energization of contactor 45 causes motor operated rheostat 46 to operate in a direction to raise the excitation and voltage of generator 3. This action in raising the excitation and voltage of generators 2 and 3 also tends to eliminate the circulating current because as the voltage of generator 1 was assumed to be too high the voltages of machines 2 and 3 were relatively too low. Consequently it will be seen that the relays 8, 9 and 10 automatically respond in the proper manner to cause compensating changes in the generated voltages of machines 1, 2 and 3 for eliminating circulating currents when the voltage of machine 1 exceeds the voltage of machines 2 and 3.

If the voltage of one of the machines, such for example as machine 1, is lower than the voltage of the other two machines the reverse operation will take place and relay 8 will close its contacts 25 due to the phase relation of the currents in the windings of this relay due to the leading current flowing in the machine 1. Also relays 9 and 10 will close their contacts 32 and 40, respectively, due to the reverse phase relations in these relays due to the fact that machines 2 and 3 will now be carrying lagging instead of leading wattless circulating currents.

In view of the detailed tracing of the circuits under the assumed condition that the voltage of generator 1 was higher than the voltages of the other machines, it is believed obvious, and unnecessary to trace in detail, how the closure of contacts 25 of relay 8 will cause energization of relay 27 which will then close a set of contacts 94, the closure of which will cause energization of relay 29 for controlling the motor operated rheostat in a reverse direction for raising the excitation and voltage of generator 1. Similarly it is believed to be obvious how the closing of contacts 32 and 40 on relays 9 and 10, respectively, will cause the energization of relays 34 and 42, causing them respectively to close sets of contacts 95 and 96, for respectively completing circuits to lowering contactors 36 and 44 for respectively causing motor operated rheostats 38 and 46, for generators 2 and 3, to lower the voltages of these generators.

From the above described operation it will be seen that the relays 8, 9 and 10 automatically respond to circulating currents produced by differences in excitation or generated voltage of the generators 1, 2 and 3, in such a manner as to increase the excitation and voltage of the machine or machines whose voltage is below that of the others and at the same time to lower the voltage of the machine or machines whose voltage is higher than that of the others.

If now, load conditions on the station do not warrant the operation of all three generators, one of them may be shut down and disconnected from the others by opening its controlling switch or circuit breaker. As soon as this is done one or the other of contacts 50, 51 or 52 will be broken, thereby deenergizing relay 49. The totalized current from the windings 12, 14 and 16 which flows in conductor 20 will then be passed through contacts 74 of relay 49, then through a portion of the auto-transformer 48 and back through contacts 75 to the conductor 20 and thence through the windings 16, 14 and 12 carrying the totalized current. At the same time there is induced in the remaining portion of the auto-transformer a current which passes through the contacts 75 so as to circulate directly in the total current carrying windings 16, 14 and 12. This current returns to this portion of the winding through controls 76. As is well known, the ampere turns of the two windings of a transformer are equal, if the normally relatively small magnetizing ampere turns are neglected. Consequently, by properly selecting the ratio of turns of the two portions of the winding of the auto-transformer 48, the amount of current circulated by the upper portion of the winding may be such as to make up for the loss of current in the total current carrying relay winding produced when one of the machines is disconnected. Therefore, the relays are just as sensitive when operating with two machines as with three machines because obviously the same range of current flows in the windings carrying currents proportional to the currents in the individual machines while due to the auto-transformer the total current also remains approximately the same for two machines as for three machines. The additional current supplied by the auto-transformer corresponds to the average current of the remaining two machines.

If the voltage of bus 4 should fall below the normal value at which the contact making voltmeter 58 balances, all three of its raise contacts 59, 62 and 65 will be completed thereby causing the simultaneous energization of raising relays 60, 63 and 66. Energization of these relays will cause closure of contacts 97, 98 and 99 thereon and closure of these contacts will complete circuits through contacts 100, 101, and 102, respectively, of relays 26, 34 and 42, which circuits will energize the raising relays 29, 37 and 45, respectively, for causing the motor operated rheostats to raise the voltage of all of the three machines. Similarly, if the voltage of the bus is too high all of the lowering contacts 59, 62, and 65 will be closed thereby energizing relays 61, 64, and 67. This causes closure of their respective contacts 103, 104 and 105, which respectively complete circuits through contacts 106, 107 and 108, of relays 27, 35 and 43, respectively, for energizing the lowering contactors 28, 36 and 44 for causing the motor operated rheostats to operate in the reverse direction for lowering the voltages of generators 1, 2 and 3.

From the above description it follows that the voltage responsive and the circulation current responsive controls for the motor operated rheostats are interlocked in such a manner that whenever the voltage of the bus 4 is too high or too low the circulating current responsive relays are deprived of control and cannot either raise or lower the excitation of their associated machines. This is because the circulating current responsive relays 8, 9 and 10 secure the control of their associated generators through series contacts 81 and 82; 86 and 87; 91 and 92, respectively, which contacts are bus voltage controlled in such a way that one of each series pair opens if the bus voltage is either too high or too low.

It will also be seen that the voltage controlling means for each of the generators is rendered inoperative for affecting its particular generator when the circulating current responsive means is calling for an opposite control of the excitation. In other words, if the bus voltage is too low whereby the voltage responsive means tends to raise the excitation of each of the machines and at the same time if the voltage of one generator is higher than the voltage of the other generators so that the circulating current responsive relay of the relatively high voltage machine tends to call for a lowering of its excitation, no change in the excitation of that machine is made until the bus voltage is restored to normal. This is because contacts 97 and 100; 98 and 101; and 99 and 102 are respectively in series. Conversely, if the bus voltage is too high and the wattless current responsive relay of one of the machines calls for raising of its excitation, the voltage responsive means will be prevented from lowering the excitation of that machine. This is because contacts 103 and 106; 104 and 107; and 105 and 108 are, respectively, in series. Thus, for example, to take a specific case, if the voltage of the bus is too high while at the same time the voltage of generator 2 is lower than the voltages of generators 1 and 3 the relay 9 will have its contacts 33 closed thereby energizing relay 35 which breaks its contacts 107. Consequently, lowering relay 64, which closes its contacts 104 in response to overvoltage, is prevented from lowering the voltage of generator 2 because the control circuit of contacts 104 is broken through contacts 107 of relay 35.

Therefore, whenever the voltage of the bus departs from normal all of the wattless circulating current responsive means are deprived of control and only the machine or machines whose wattless circulating current is in a direction which will automatically be compensated for and corrected by the voltage responsive means, in attempting to restore the voltage to normal, will be voltage controlled. Consequently, only this machine or machines will bring the voltage of the bus back to normal but this action will in itself tend to cancel circulating currents. If these currents are not eliminated when the voltage is restored to normal, the wattless circulating current responsive means of the other machine or machines will then come into play and quickly reduce the circulating current to the desired minimum value.

As has already been briefly mentioned above, if any two of the generators are disconnected from the bus, the connections between the positive side of the control source and the contacts of the relays 8, 9 and 10 are broken so that accidental operation of the wattless current responsive relay of the single remaining machine cannot cause any effect on the excitation. This is, of course, desirable as there cannot be any problem of circulating current with a single machine.

While I have shown and described a particular embodiment of my invention, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a plurality of parallel alternating current electric circuits, a separate relay for each of said circuits for controlling a corresponding electrical quantity thereof, each of said relays having a winding connected to be energized in accordance with the value of said quantity of its associated circuit, and each of said relays having a winding connected to be energized in accordance with the value of the sum of said quantities of all of said circuits, the windings of each of said relays being inductively related in such a manner that when the currents in them are in phase they produce no net operating effect.

2. In combination, a plurality of parallel electric circuits, a separate relay for each of said circuits for controlling a corresponding electrical quantity thereof, each of said relays having a winding connected to be energized in accordance with the value of said quantity of its associated circuit, each of said relays having a winding connected to be energized in accordance with the value of the sum of said quantities of all of said circuits, means for disconnecting one of said circuits from the others, and means responsive to said disconnecting means for further energizing said last mentioned windings in accordance with a quantity corresponding to the average of said quantities of the remaining circuits.

3. In combination, a plurality of parallel connected alternating current dynamo-electric machines, a separate two-coil relay for each machine, one coil of each relay being connected to carry a current proportional to the current in its associated machine, the remaining coil of each relay being connected to carry a current proportional to the total current in all of said machines, and separate means controlled by each relay for controlling the wattless current in its associated machine.

4. In combination, a plurality of parallel alternating current circuits, a winding, means for energizing said winding with a current corresponding to the total current in said parallel circuits, means for disconnecting one of said circuits from the others, and means controlled by said disconnecting means for supplying to said winding a current corresponding to the average current of the remaining circuits.

5. In combination, a plurality of parallel connected alternating current dynamo-electric machines, a separate two-coil relay for each machine, one coil of each relay being connected to carry a current proportional to the current in its associated machine, the remaining coil of each relay being connected to carry a current proportional to the total current in all of said machines, separate means controlled by each relay for controlling the current in its associated machine, means for disconnecting one of said machines from the rest, and auto-transformer means for supplying said remaining windings with an additional current which is proportional to the average current in the remaining machines.

6. In combination, a plurality of parallel connected alternators, means for eliminating wattless current interchange between said alternators comprising a separate two current coil phase angle responsive relay for each alternator, one coil of each relay being connected to respond to a current whose phase angle varies with the phase angle of the current of its associated machine, the remaining coil of each relay being connected to carry a current whose phase angle varies with the phase angle of the vector sum of the currents of said machines, and means controlled by each of said relays for varying the excitation of its associated alternator in such a manner as to tend to maintain the currents in the coils of said relays in phase with each other.

7. In combination, a plurality of parallel alternating current electric circuits, means including a separate relay for each circuit for controlling the wattless circulating current in its associated circuit, each of said relays being of the induction disc type and having two current coils which together produce a torque on said disc whose direction reverses depending upon whether the current in one of the coils leads or lags the current in the other of said coils and whose magnitude is proportional to the product of said currents, and means for passing through one of the coils of each of said relays a current which corresponds in phase and magnitude with the current in its associated circuit, and for passing through the remaining coil of each of said relays the sum of the currents in the other coils.

8. In combination, a bus, a plurality of dynamo-electric machines connected in parallel to said bus, a separate current responsive relay for each machine for adjusting the voltage of its associated machine in such a manner as to equalize the voltages of said machines, means responsive to the voltage of said bus for controlling the voltage of all of said machines together so as to maintain constant bus voltage, and electrical interlocks between said relays and said means for preventing said relays from changing the voltages of their associated machines in a direction opposite to that called for by said bus voltage regulating means when the bus voltage is not normal.

9. In combination, an alternating current circuit, three synchronous alternating current dynamo-electric machines, separate switches for connecting said machines in parallel to said circuit, a separate relay for each machine, each of said relays having two current coils for producing reversible operation of said relays depending upon whether the current in one coil leads or lags the current in the other coil, connections for energizing one coil of each relay with a current corresponding with the current in its associated machine and for energizing the remaining coil of each relay with a current corresponding to the total current of all three of said machines, means controlled by each relay for varying the excitation of its associated machine, means controlled by said switches for preventing said relays from controlling the excitation of their associated machines unless at least two of said machines are connected to said circuit, auto-transformer means controlled by the opening of any one of said switches for supplying to the last mentioned coils of said relays an additional current corresponding to the average current of the remaining two machines connected to said circuit, means responsive to the voltage of said circuit for controlling the excitation of all of said machines, and interlocks between said relays and said voltage responsive means for preventing conflicting control of the excitation of said machines.

HERMAN BANY.